United States Patent
Nattkemper et al.

(10) Patent No.: US 10,785,853 B2
(45) Date of Patent: Sep. 22, 2020

(54) HIGHLY FUNCTIONAL OPERATING DEVICE

(71) Applicant: BAG ELECTRONICS GMBH, Arnsberg (DE)

(72) Inventors: Guido Nattkemper, Froendenberg (DE); Wolfgang Michaelis, Moehnesee (DE); Thomas Kremer, Schmallenberg (DE)

(73) Assignee: BAG ELECTRONICS GMBH, Arnsberg (DE)

( * ) Notice: Subject to any disclaimer, the term of this patent is extended or adjusted under 35 U.S.C. 154(b) by 0 days.

(21) Appl. No.: 16/084,957

(22) PCT Filed: Mar. 13, 2017

(86) PCT No.: PCT/EP2017/055835
§ 371 (c)(1),
(2) Date: Sep. 13, 2018

(87) PCT Pub. No.: WO2017/157848
PCT Pub. Date: Sep. 21, 2017

(65) Prior Publication Data
US 2019/0104598 A1    Apr. 4, 2019

(30) Foreign Application Priority Data

Mar. 13, 2016 (DE) .................... 10 2016 002 963

(51) Int. Cl.
*H05B 37/02* (2006.01)
*H05B 47/18* (2020.01)
*H04L 12/40* (2006.01)

(52) U.S. Cl.
CPC ....... *H05B 47/18* (2020.01); *H04L 12/40019* (2013.01)

(58) Field of Classification Search
CPC ............ H05B 37/0227; H05B 37/0254; H05B 37/0281
(Continued)

(56) References Cited

U.S. PATENT DOCUMENTS 7,157,860 B2    1/2007  Catoul et al.
7,741,785 B2 *  6/2010  Juen .................... H05B 41/40
                                                    315/149

(Continued)

FOREIGN PATENT DOCUMENTS

DE         10149261      5/2003
DE       102006054785    5/2008
(Continued)

OTHER PUBLICATIONS

English translation of International Search Report from corresponding PCT Appln. No. PCT/EP2017/055835, dated May 24, 2017.
(Continued)

*Primary Examiner* — Tung X Le
(74) *Attorney, Agent, or Firm* — Grossman, Tucker, Perreault & Pfleger, PLLC

(57) ABSTRACT

The invention relates to an operating device for operating at least one lighting means comprising a grid input stage and at least one output stage connected to the grid input stage with output connections for connection to the lighting means, a control device for controlling the output stage or operation of the at least one lighting means, and a first digital bidirectional control interface for connection to a first external digital control bus with addressing functionality for receiving external control information, in particular a DALI (Digital Addressable Lighting Interface) interface. The operating device according to the invention is characterized in that it comprises a second digital bidirectional control interface for connection to a second external (in relation to
(Continued)

operating device) digital control bus with addressing functionality, wherein first and second control interfaces are designed for operation with different data protocols.

17 Claims, 6 Drawing Sheets

(58) Field of Classification Search
USPC .......................................... 315/152, 307, 312
See application file for complete search history.

(56) References Cited

U.S. PATENT DOCUMENTS

| | | | |
|---|---|---|---|
| 7,880,405 B2 * | 2/2011 | Chitta | H05B 37/0245 |
| | | | 315/209 R |
| 9,888,547 B2 | 2/2018 | Fischer et al. | |
| 2007/0268152 A1 * | 11/2007 | Juen | H05B 37/0227 |
| | | | 340/9.11 |
| 2008/0042581 A1 * | 2/2008 | Huber | H05B 37/0254 |
| | | | 315/158 |
| 2008/0258551 A1 * | 10/2008 | Chitta | H05B 47/18 |
| | | | 307/3 |
| 2016/0066395 A1 * | 3/2016 | Yao | H05B 47/20 |
| | | | 315/209 R |

FOREIGN PATENT DOCUMENTS

| | | |
|---|---|---|
| DE | 102014103524 | 9/2015 |
| WO | 99/14989 | 3/1999 |
| WO | 2009/100762 | 8/2009 |
| WO | 2013/059848 | 5/2013 |
| WO | 2015/112637 | 7/2015 |

OTHER PUBLICATIONS

English translation of International Preliminary Report on Patentability from corresponding PCT Appln. No. PCT/EP2017/055835, dated Sep. 18, 2018.
Digital Addressable Lighting Interface—Wikipedia, Dec. 2, 2019, pp. 1-7.

* cited by examiner

HIGHLY FUNCTIONAL OPERATING DEVICE

FIELD

The invention relates to an operating device for operating at least one lighting means, comprising a grid input stage and at least one output stage connected to the grid input stage with output connections for connection to the lighting means, a control device for controlling the output stage and a first digital bidirectional control interface for connection to a digital control bus with addressing functionality for receiving external control information.

BACKGROUND

Such operating devices are well known in this field and are used today in particular for operating or feeding LED devices. Light management systems as control systems for transmitting or connecting such operating devices are often based on the DALI (Digital Addressable Lighting Interface) standard, which is currently defined under IEC 62386 and provides a digital directional control interface. Another such interface could be DSI (Digital Serial Interface), for example.

It must be noted that increasingly complex light management systems are being developed in the field as control systems, in particular by integrating or connecting a large number of sensors, operating devices and/or data terminals into such a management system or control system in order to solve complex lighting tasks.

SUMMARY

The invention is based on the object of further developing such a conventional operating device in such a way that current lighting tasks can be solved better and more flexibly. For this purpose, the invention proposes to provide a second digital bidirectional control interface for connection to another external digital control bus with addressing functionality, wherein the first and second control interfaces are designed for operation with different data protocols. The device designed according to the invention provides a highly functional operating device that is particularly suitable for complex lighting tasks with a large number of operating devices, sensors or data terminals etc. connected on the control side of a lighting system. This operating device according to the invention can flexibly solve such lighting tasks and at the same time meet current standards, in particular the DALI standard according to IEC 62386, or it can be connected to conventional lighting management systems based on this standard.

Preferably, the two digital bidirectional control interfaces in the operating device according to the invention can be designed as asynchronous and serially operating control interfaces.

It may also be provided that a large number of operating devices, sensors and data terminals can be connected to the second digital data bus in a similar manner to the first digital bus, wherein the operating device according to the invention is also set up for communication with such bus participants via the second control interface. Such bus participants can be, for example, lighting means, operating devices, sensors for ambient temperature, motion detectors, light sensors, sensors for detecting the light color emitted by a luminaire or lighting system, etc. It should be noted that the terms "control bus" and "data bus" are used synonymously here.

It may appropriately be provided that the second digital control interface has a transmission rate greater than the transmission rate of the first digital control interface, in particular at least 5 times or even 10 times the transmission rate of the first digital control interface. In particular, this design measure makes it possible to connect the operating device according to the invention to established and current lighting management systems, in particular via a DALI interface, as the first digital bidirectional control interface, while complex and/or fast control tasks such as color control within a lighting system or a luminaire can be implemented via the second digital interface by integrating a plurality of operating devices.

In order to further increase the functionality of the operating device according to the invention, it may be provided that it has an operating time detecting device, a lighting means operating parameter detecting device, for example for detecting the lighting means current or the energy consumption of the connected lighting means, a device for detecting the current power consumption of the operating device, the current grid voltage to which the operating device is connected for supply and/or an internal temperature detecting device. It is expedient for the operating device according to the invention to include a data processing device for data processing of the detected operating parameters and/or environmental parameters and a memory for storing the detected and/or data-processed parameters. Data for implementing a CLO (Constant Light Operation) can, for example, also be stored in the memory of the operating device according to the invention in order to compensate for the degradation of the lighting means depending, for example, on the total operating time of a lighting means by increasing the lighting means current, for example an LED operating current, to set a certain dimming level during the lifetime of the lighting means in accordance with its degradation.

Since the operating device according to the invention can be designed to record a large number of external and/or internal operating data, it can, if operating errors are detected and/or a predetermined threshold value of an internal and/or external operating parameter is exceeded, output a corresponding signal via the first and/or the second digital interface or perform or arrange a shutdown of the operation to avoid destruction, wherein, for example, thermal protection can be provided for the operating device.

Since the operating device according to the invention may be designed to store a large number of internal and/or external operating parameters and the information processed for this purpose in a memory, it may be expedient for the operating device to be designed so that these data are retrieved via the first and/or second interface, for example via a data terminal such as a smartphone or a tablet, which can be connected to the operating device according to the invention via the first interface or via the second digital bus to the second interface.

It may be expedient for the second digital control interface to be designed as a user-programmable interface to provide a user-specific command set of the interface. In particular, this programming can be carried out directly via the second digital control interface. However, it is also possible to program the second digital interface via the first digital control interface. It can be provided that a basic set of commands is stored in the second digital control interface for its operation, which includes functions for programming and monitoring stored and/or processed operating data. Furthermore, a memory area can be provided within the second digital control interface to store user-specific program code.

Such designs can enable the users to connect their own components to the operating device according to the invention via the second digital bus, provided that the interfaces of these other components are programmed accordingly for connection to the second digital bus.

The second interface of the operating device according to the invention can appropriately be designed for connection to a two-pole bus, wherein this bus can have a two-pole bus supply. It may also be provided that the bus is supplied via a safety extra-low voltage (SELV) bus, which can be provided, for example, by one of the master interfaces connected to the bus. In this respect, it may be provided that an operating device according to the invention can be configured as a master in relation to the second digital bus.

As already explained above, the first digital interface of the operating device according to the invention can be designed in particular for connection to a DALI bus or a DSI bus, wherein the former usually operates at a transmission rate of 1200 baud. In contrast, the second digital control interface can be designed, for example, for connection to an $I^2C$ bus (Inter-Integrated Circuit), wherein this bus can be designed, for example, for connecting several operating devices according to the invention within a luminaire or also for connecting several luminaires within a lighting system, and wherein a large number of other components such as sensors can be connected to this second bus via corresponding interfaces, as described. In other embodiments of the operating device according to the invention, said second digital control interface can also be designed as an RS 485 interface or as an RS 232 interface, which all have transmission rates that comprise more than 10 times the transmission rate of a DALI bus. Operation according to the $I^2C$ standard allows transmission rates over several Mbps.

It may be expedient to provide that the operating device according to the invention is designed between the two digital interfaces for internal bidirectional data exchange, so that, for example, control information and/or sensor information can be transmitted internally from one control interface to the other.

The operating device according to the invention can be set up to transfer information from the first bus, to which the operating device according to the invention is connected via the first digital control interface, to the second digital bus, to which the operating device is connected via the second digital control interface, wherein it is possible for the data to be changed or processed in the operating device beforehand. Information, in particular control information, can be transmitted by this design from the bus users of the first digital bus to bus users of the second digital bus. In this sense, the operating device according to the invention can provide gateway functionality, wherein processing of the control information may further also occur in the control unit, so that the control or operating data can also be filtered or modified between the two interfaces.

In particular, in order to provide control of operating parameters such as a lighting means current for operating a lighting means connected to the operating device via both the first and second control interfaces, it may be provided that both control interfaces are connected to the control device of the operating device for the exchange of control information.

The control device of the operating device according to the invention may be designed to perform a maintenance function when detecting faults, critical operating states of the operating device or the lighting means and/or when a predetermined service life limit of operating devices and/or lighting means is reached, in particular by transmitting associated information via the first and second interfaces or via the second interface, in particular to a data terminal connected to the second interface via the second digital bus. As explained above, the second interface of the operating device according to the invention, with which it is connected to the second bus, can be set up for transmitting operating information stored in the memory to a data terminal device, which is itself connected to the second data bus.

The operating device according to the invention is particularly suitable for designing a lighting system which comprises at least one operating device, in particular two thereof, which are connected to a common second digital bus and thus to one another via the respective second control interface, wherein one of the at least two operating devices is able to be connected to a central control device via its first digital control interface with which it is connected to the first external control bus.

It may expediently be provided for one of the operating devices to act as the master of the second external bus and to control the operation of the lighting means connected to the other operating devices by means of a corresponding control signal via the second digital bus. A lighting system designed as described has advantages over conventional lighting systems, particularly in time-critical lighting scenarios, for example in controls between operating devices connected via a digital bus, due to the much higher transmission rate on the second digital bus or via the second digital control interfaces. For example, such a lighting system according to the invention can be used to achieve color control of the light emitted by the system, in which a plurality of operating devices connected to the second digital bus together with a color light sensor feed light sources, such as LED devices, which emit light of different color temperature. One of the operating devices according to the invention can be configured as a master, which controls other operating devices to operate the respective lighting means, wherein the master operating device can control the output of light with a specified color temperature.

To avoid grid interference on the lighting means, a load transmission device for galvanic decoupling can be provided between the grid input stage and output stage. This can, for example, be designed as a transformer system whose primary side is arranged on the grid side and whose secondary side is arranged on the output stage side. In order to save a special electrical isolation between the first and second digital interfaces on the control side, the invention may also provide to realize the connection between the first and second digital interfaces via the load transmission device, in particular by means of modulation and associated demodulation devices arranged on the primary and secondary sides.

In the case of a lighting system according to the invention, at least some of the operating devices may be connected to a common bus, the second digital bus, via the second digital interface.

To display or further process the operating information stored within an operating system according to the invention, it may be expedient to provide that a data terminal is connected to a common second digital control bus from which the operating data stored in the connected operating devices can be retrieved. Since the two digital interfaces can be connected to one another and designed for internal bidirectional data exchange in an operating device, it may be provided that a data terminal connected to the second digital control bus transmits control information to one of the at least two operating devices configured as a master, wherein the control information is transmitted internally to the first digital interface from which it transmits via the first digital bus to another operating device connected to the first digital bus for controlling the operation of its lighting means. Similarly, when the flow of information is reversed, it may be provided that control or data information may be transmitted via the first interface to an operating device, which is output via the second interface and transmitted via the second digital bus to another operating device for controlling the operation of its lighting means.

It is understood that the described exchange of information between the two buses can include not only control information, but also any information, such as sensor information or operating information.

In order to provide a central energy or power measurement within the lighting system according to the invention, it may be provided that the at least two operating devices are connected to a supply grid via an energy or power measurement device on the supply side, wherein these measurement devices have an interface for connection to the common second digital control bus for transmitting electrical consumption values, in particular to a master configured with respect to the second digital control bus.

For energy-related reasons, it may be expedient for the specified energy or power measuring device to have a supply output to which an operating device configured as a master is connected via the common second digital bus, wherein the lighting system has a controllable switching device, which can be integrated in particular in the measuring device, which is connected on the input side to the grid and on the output side to the respective grid stages of the other operating devices. This means that if necessary, particularly in the case of complex lighting systems, at least some of the operating devices can be shut down, for example if a standby command is transmitted from a central control management system via the first digital control bus, so that, for example, only the master operating device configured for the second digital bus can be put into standby mode and the other operating device can be switched off.

BRIEF DESCRIPTION OF THE DRAWINGS

The invention is explained below by describing some of the embodiments with reference to the enclosed drawings, wherein.

DETAILED DESCRIPTION

Figure 1:
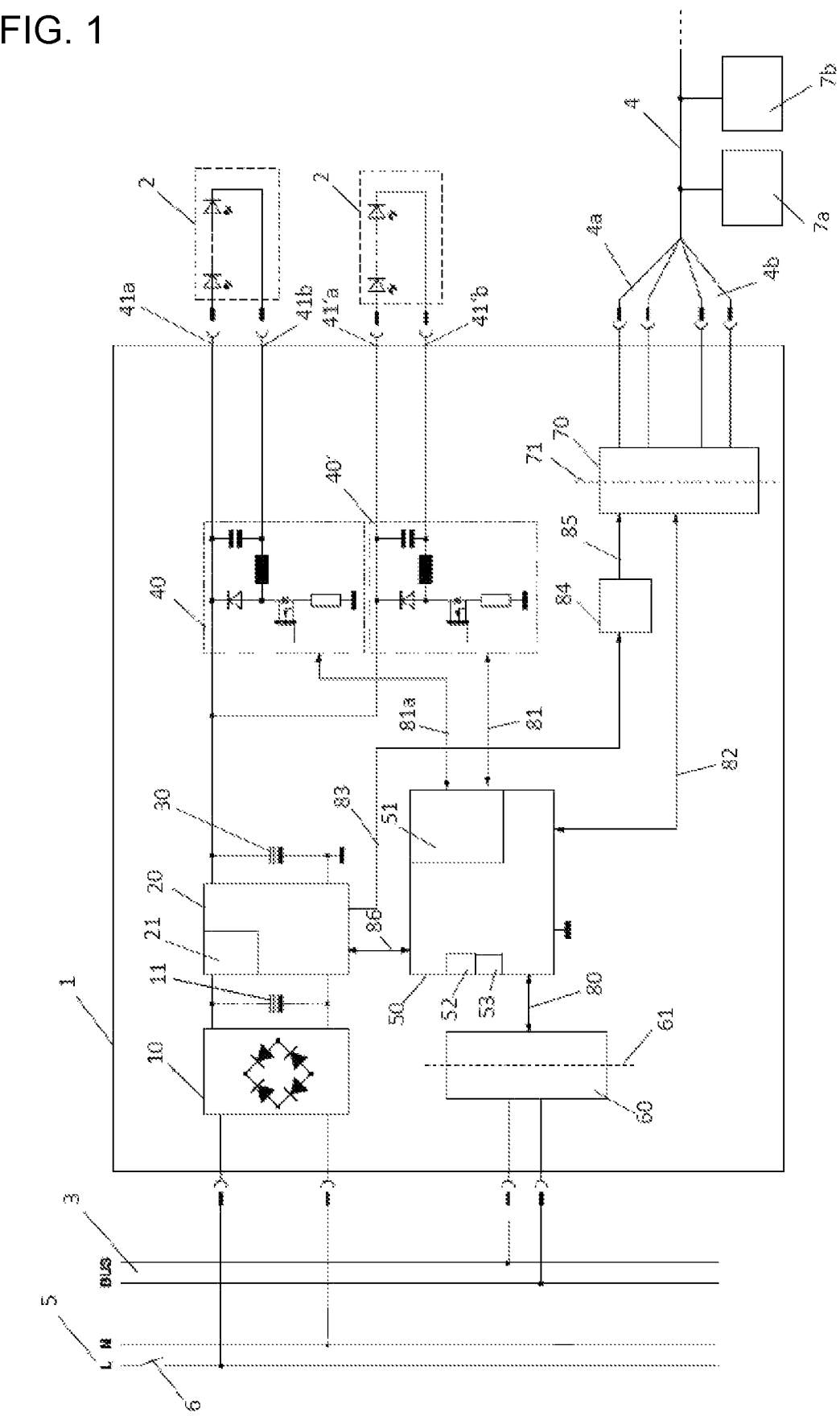
FIG. 1 shows in a schematic diagram a first version of an operating device designed in accordance with an invention.

FIG. 1 shows the operation of an operating device according to the invention for feeding two LED devices 2. Operating device 1 has connections on the input side for connection to a supply network 5, which are connected to a rectifier 10, which in the described embodiment also has a grid filter. An optional DC link capacitor 11 is connected on the output side, which represents the input for a first converter stage 20, which is designed here as an AC/DC converter. The first converter stage 20 has a power measuring device 21 to measure the electrical power consumed. A DC link capacitor 30 is assigned to the first converter stage on the output side, which feeds the second converter stages 40, 40', which supply the LED devices 2 connected there as output stages with output connections 41a, 41b; 41'a, 41'b. In the output stages 40, 40' the LED current is regulated. The output stages 40, 40' are conventionally designed, for example as clocked converters as shown, so that they have a high electrical efficiency.

The first converter stage 20 and the two output stages 40, 40a are controlled by a control device 50, which comprises a special control unit 51 for controlling the two output stages in the embodiment described. For the control as described above, the control device 50 is connected to the first converter stage via bidirectional lines 86, from which data of the power measuring device can be transmitted to the control device. The output stages 40, 40' are controlled via the specified connection 81a, 81b, via which signals are also transmitted from the output stages to the control device 50, in this case measuring signals relating to the respective load current through the two LED devices. FIG. 1 shows a measuring resistor in the circuits for this purpose.

The operating device according to the invention also comprises a conventional DALI interface 60, with which operating device 1 is connected to an external DALI bus 3. The figure shows galvanic decoupling 61, which can be implemented, for example, via optocouplers. DALI interface 60 is connected to the control device 50 via communication links 80 and thus receives control and data information via bus 3, for example from a central lighting management device.

In addition, the operating device 1 according to the invention has a second digital interface 70, which in the described embodiment is designed as an I²C interface and supports transmission speeds of up to several Mbps bidirectionally. The I²C interface also comprises a galvanic decoupling 71 and is designed in the described embodiment as a master interface for supplying the external I²C bus 4, which comprises a data bus part 4b with two poles and a two-pole supply part 4a, which is supplied by the operating device according to the invention in the embodiment of FIG. 1. For this purpose, interface 70 is connected to the first converter device 20 via a voltage adaptation 84 and lines 85, 83, so that the necessary operating voltage for supplying all other interface devices connected to the bus is present at bus 4. The figure shows further I²C bus participants 7a, b.

The I²C interface 70 is internally connected to the control device 50 via bidirectional communication links 82, so that internal gateway functionality can be implemented between the DALI interface 60 and the I²C interface 70. As can be recognized by the person skilled in the art, it is basically possible that operating device 1 in FIG. 1 can be designed or configured both as a master for bus 4 external to operating device 1 and as a master for bus 3 external to operating device. Similarly, operating device 1 in FIG. 1 can be configured or designed as a slave with respect to both the DALI interface and the I²C interface, or only as a master for the I²C bus 4 as shown in FIG. 1.

As with the DALI bus 3, lighting equipment can in principle be connected to the second digital bus 4 via corresponding interfaces, in particular also data terminals, possibly via a communication module with air interface, wherein information, in particular control information, can be transmitted between the two digital interfaces or buses as required depending on the configuration, so that the operating device 1 according to the invention can be configured highly functionally and flexibly to meet any requirements. For example, the I²C interface 70 can be designed to be programmable, so that users can define their own command sets for integrating additional bus devices and a more flexible configuration of general management systems is made possible with the operating device 1 according to the invention. In the embodiment described, interface 70 is designed as an Open API (Application Programming Interface).

Figure 2:
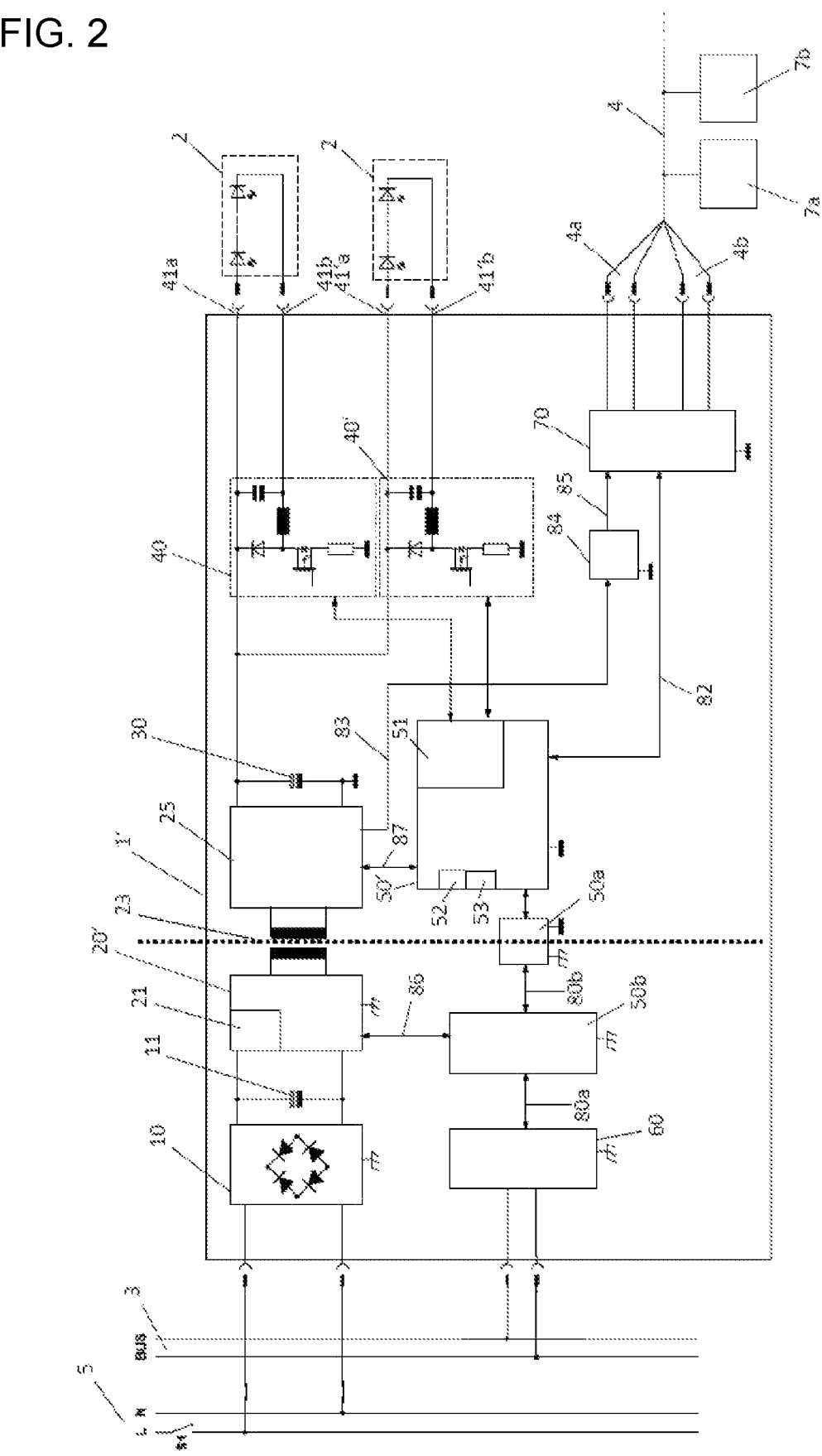
FIG. 2 shows a second embodiment of an operating device designed according to the invention in a schematic representation.

FIG. 2 shows another operating device 1' designed in accordance with the invention, again in a schematic diagram, which in relation to many devices is identical to the operating device according to FIG. 1. An essential difference between operating device 1, 1' is the galvanic decoupling of the grid and the LED devices, i.e. in the power range as well as in a galvanic decoupling in the control range of the operating device. Components which have essentially the same effect in relation to the embodiment according to FIG. 1 are marked with identical reference numerals in the diagram of operating device 1' in FIG. 2. The first converter stage 20' is designed in this case as an AC/AC converter, which supplies a transformer system 23 on the output side, which is provided for galvanic decoupling on the power line. A controllable AC/DC converter 25 is provided on the secondary side, which in turn provides the DC link voltage at capacitor 30 for the subsequent output stages 40, 40a.

Due to the galvanic decoupling of the control side, the control device of operating device 1 according to FIG. 2 comprises three components in the described embodiment: the control part 50', which essentially comprises the functionalities of the control device 50 of operating device 1 of FIG. 1, in addition control decoupling 50a, for example in the form of optocouplers, and the control part 50b, which controls the first converter stage 20' via connection 86. In addition, measured data of the power measuring device 21 are transmitted via the control part 50b, the control decoupling 50a to the control device 50' via connection 86 from the converter stage.

As can be seen from FIG. 2, a gateway functionality between the DALI interface 3 and the I²C interface 70 is also implemented bidirectionally in the embodiment according to FIG. 2, so that the functionality of the operating device according to FIG. 2 does not differ from that according to FIG. 1, with the exception that a lower susceptibility to interference is realized due to the decoupling of the supply grid and LED load. Since decoupling is provided centrally on the control side by control decoupling 50a, the decouplings 61, 71 described with reference to FIG. 1 may be omitted in the digital interfaces.

Figure 3:
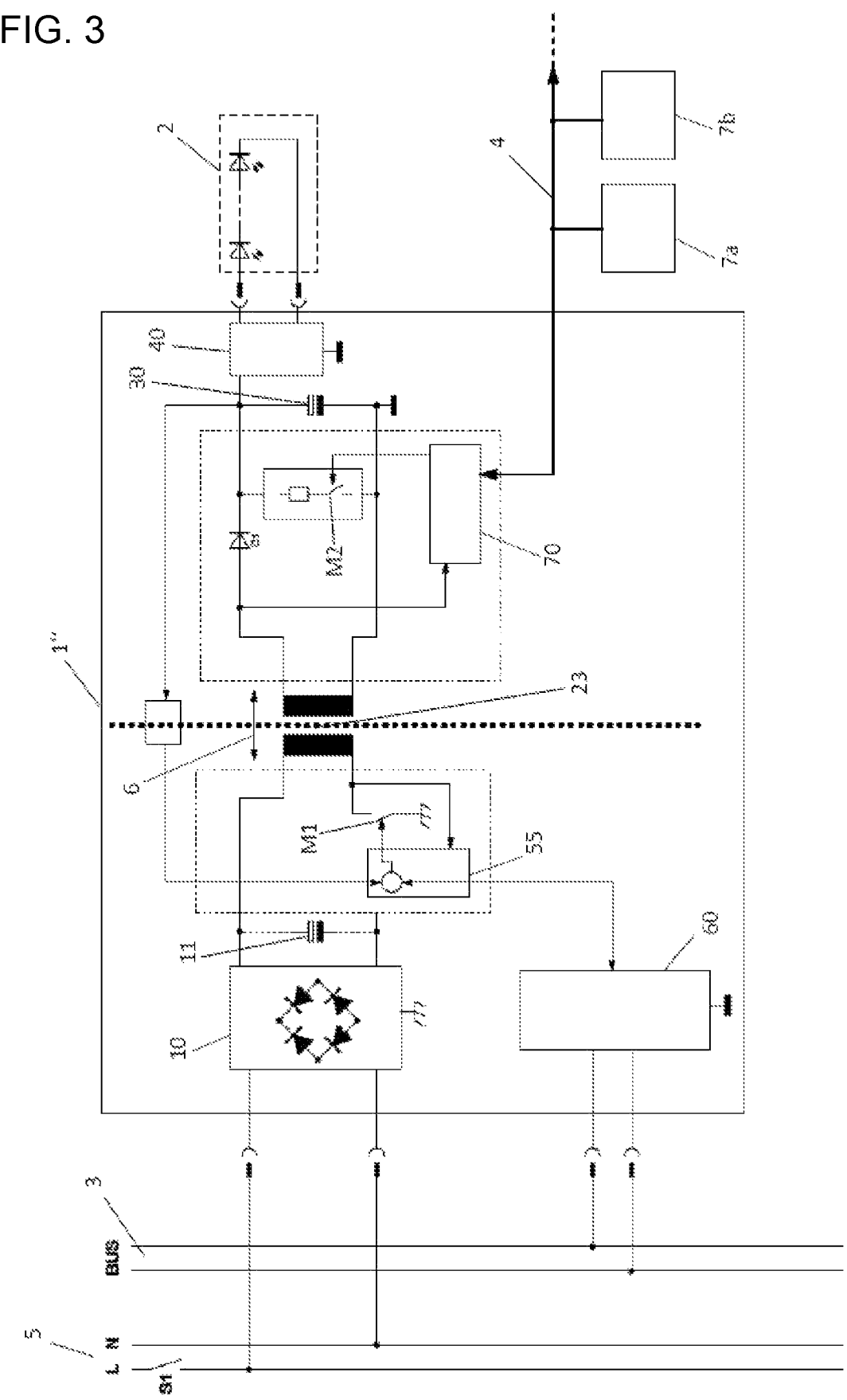
FIG. 3 shows a third embodiment of an operating device designed according to the invention in a schematic diagram.

FIG. 3 shows a third embodiment of an operating device according to the invention, which in turn has a DALI interface 60 and as a second digital interface an I²C interface 70, wherein the gateway functionality between the two interfaces is implemented via the transformer system 23 described with reference to the version according to FIG. 2, and wherein this gateway functionality is set up bidirectionally. FIG. 3 shows only the modulation means in the form of controllable switches M1, M2 on the secondary and primary side of the transformer system 23, but not the corresponding detection devices, for example in the form of a peak detector on the secondary side for the information transmitted from DALI interface 60 to I²C interface 70, so as to simplify the illustration. The modulation switch M1 is controlled by the control device 55 as a function of the data to be transmitted from the DALI interface and as a function of the DC link voltage at the DC link capacitor 30 in such a way that on the one hand the data can be acquired on the secondary side and on the other hand a predetermined DC link voltage at capacitor 30 can be maintained to supply the output stage 40. In the reverse direction, the digital interface 70 modulates the secondary-side load circuit in the described embodiment, so that the resulting fluctuations on the primary side to transformer system 23 can be detected by the control device 55 in a manner not shown in order to transmit information from the I²C interface 70 to DALI interface 60 via the transformer system 23. The described gateway functionality between the two interfaces is shown in FIG. 3 by the double arrow G.

Figure 4:
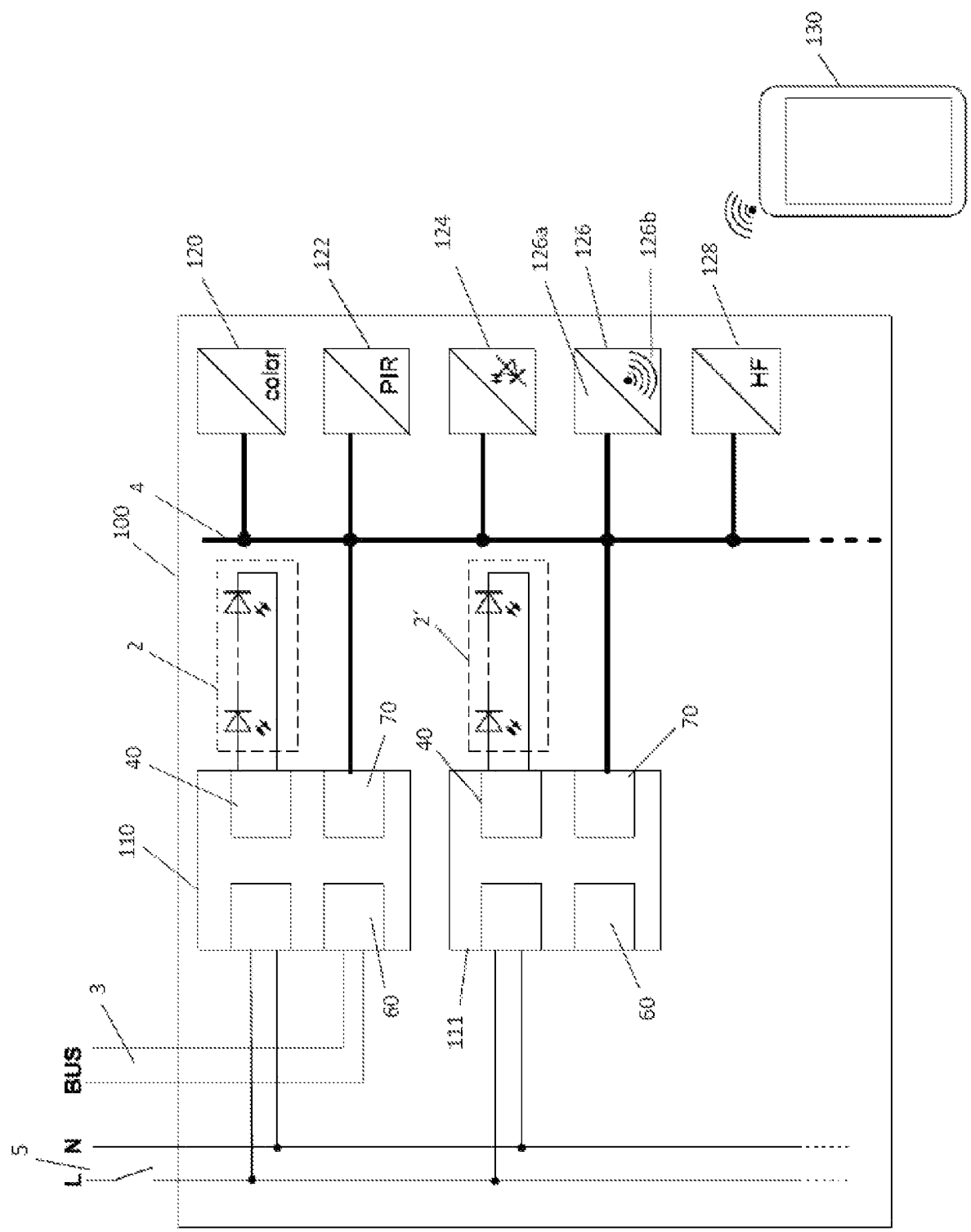
FIG. 4 shows a lighting system according to the invention using several operating devices according to the invention in one luminaire in a schematic diagram.

FIG. 4 shows a lighting system according to the invention in the form of a luminaire 100 comprising two operating devices designed in accordance with the invention in one of the embodiments described above, in particular those specified in FIG. 1. The luminaire has two operating devices 110, 111, which are basically identical in design and have both a DALI interface 60 and an I²C interface 70. They each comprise an output stage 40 for supplying an LED device 2, 2', wherein here the first LED device mentioned emits light with a color temperature of 2700K and the second LED device 2' emits light with a color temperature of 6500K, so that the light emitted by the lighting means can be variably adjusted in a known manner with respect to the so-called Correlated Color Temperature (CCR) of the light. Such luminaires are referred to in the field as "Tunable White" luminaires.

Both operating devices are connected to the grid 5, wherein the operating device 110 receives corresponding control signals for controlling or regulating the color temperature from a central lighting management device (not shown) via DALI bus 3. Both operating devices 110, 111 are connected to the common I²C bus 4 via their two second digital interfaces 70, wherein the operating device 110 or its interface 70 acts as master for the digital I²C bus in the embodiment described. In an embodiment not shown, such a luminaire can include other operating devices according to the invention, for example a total of four, so that four different LED devices can be used for a corresponding color setting with regard to their color temperature.

As can be seen in FIG. 4, the luminaire contains a plurality of sensors or is connected to the common digital bus 4 external to the operating devices 110, 111, namely a color sensor 120, a passive infrared motion detector 122, a light sensor 124, a communication device 126 and a further, here HF motion detector 128. All connected devices have a corresponding I²C interface for connection to bus 4 and the actual function module. For example, communication device 126 includes an I²C interface 126a and a Bluetooth interface 126b for communication with a tablet 130, which in turn includes a Bluetooth interface for communication with communication device 126. Operating parameters of the luminaire can be called up or set via the tablet, for example, and it is also possible to transmit information or control data via the DALI bus 3 or to request corresponding data via the described gateway functionality of a control device according to the invention. The luminaire of the type shown in FIG. 4 can be used particularly effectively to control the color temperature of the luminaire, which is particularly effective in a treadmill with a number of LED devices of different color temperatures, as the high transmission rate of bus 4 enables effective control of the current color temperature of the entire luminaire via the I²C bus. This control is carried out in the described embodiment in operating device 110, which transmits corresponding control information to operating device 111 via bus 4 and requests current sensor signals from color sensor 120.

Figure 5:
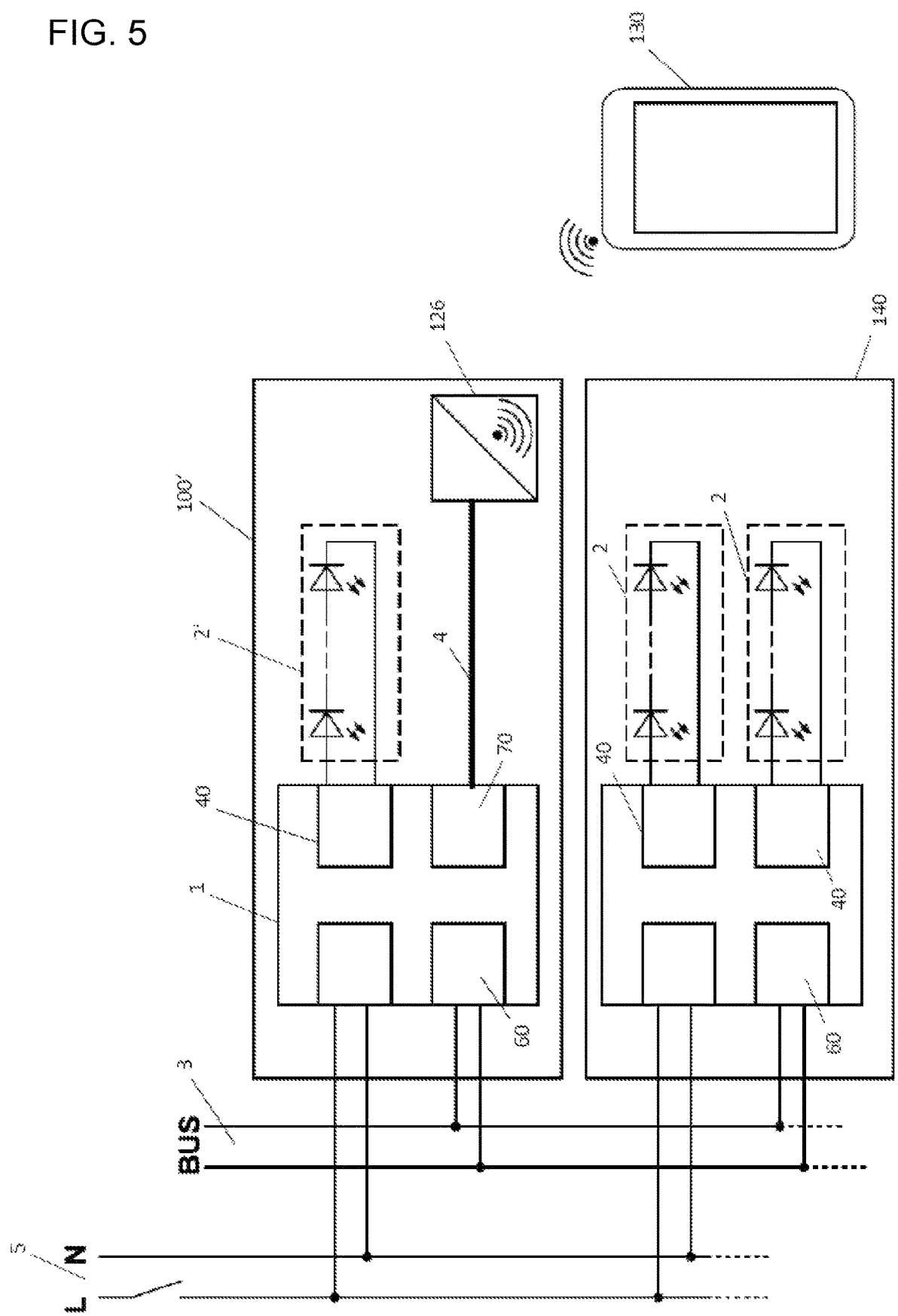
FIG. 5 shows a lighting system according to the invention using an operating device according to the invention in a schematic diagram.

FIG. 5 shows another embodiment of a luminaire system according to the invention. The system comprises an operating device 1 according to the invention in a luminaire 100', wherein a single output stage 40 feeds an LED device 2'. As in the previous example, a communication device 126 is connected to the output of digital interface 70 for communication with a tablet via the Bluetooth standard. Operating device 1 is also connected to the external DALI bus 3 via its DALI interface 60. The system also includes a conventional luminaire 140 with two channels, i.e. two output stages 40 for independent feeding of two LED devices 2. In the lighting system according to FIG. 5, operating device 1 is designed as a master in relation to DALI bus 3, so that, for example, the DALI bus 7 and thus the DALI interface 60 of luminaire 140 can be accessed by the tablet 130 via the I²C interface 70 and the described communication link between the two interfaces 70, 60, so that luminaire 140 can also be configured, controlled or data can be queried therefrom via the described path using tablet 130.

Figure 6:
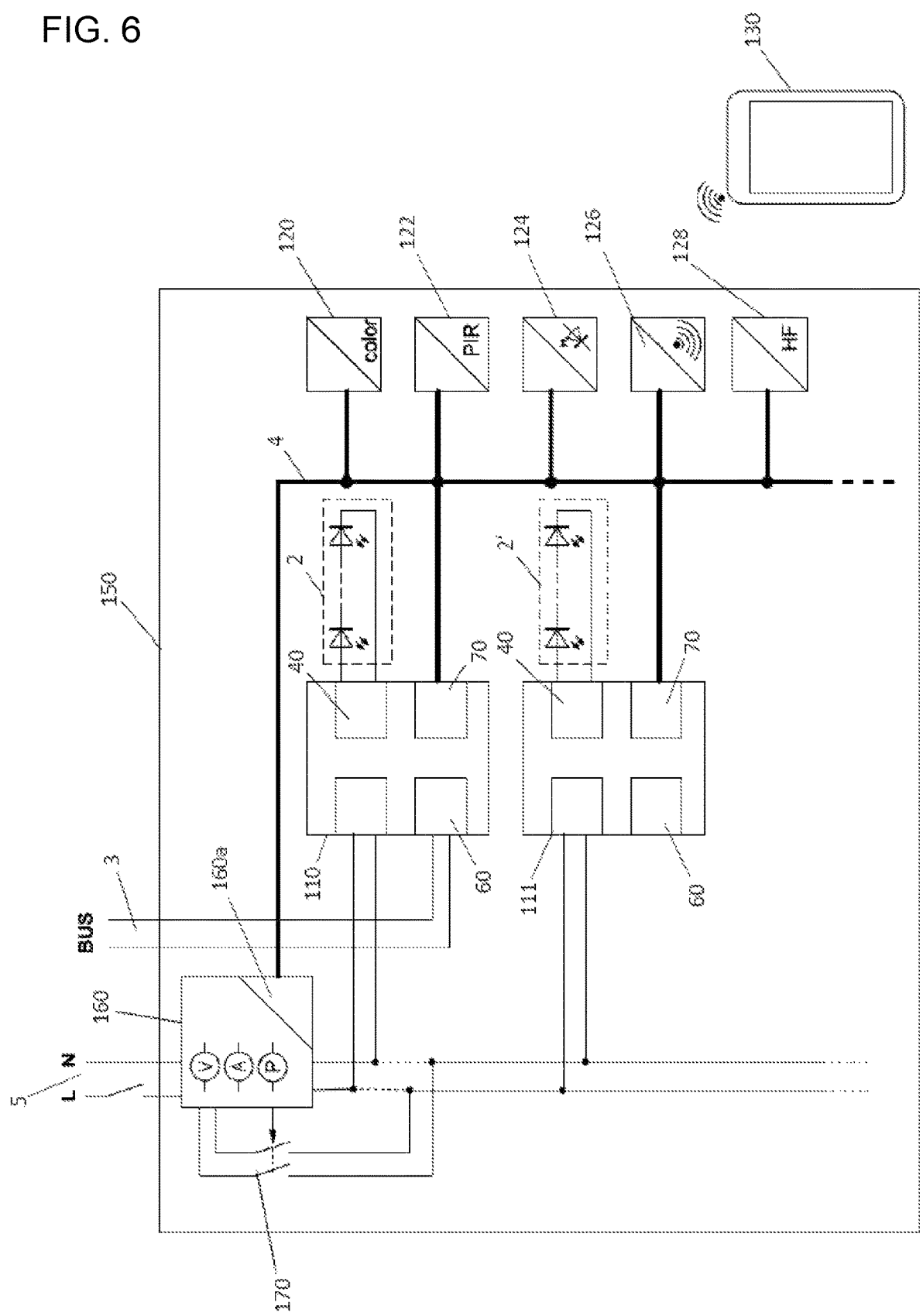
FIG. 6 shows another embodiment of a lighting system designed according to the invention in a schematic diagram.

FIG. 6 shows another lighting system according to the invention in the form of a luminaire 150, which is constructed similarly to luminaire 100 according to FIG. 4. The only difference is that a power measuring device 160 is provided on the grid input side to measure the electrical power consumed by the luminaire. The power measuring device 160 has an I²C interface 160a, which connects device 160 to digital bus 4, so that corresponding power values can be retrieved from master 110 and transmitted to the tablet 130, for example.

In the embodiment as shown in FIG. 6, the power measuring device 160 controls an optional relay 170, for example to switch off the other operating devices in standby mode for energy-saving reasons. In an embodiment not shown, the relay can be connected to the I²C bus via an appropriate interface and can therefore be controlled by the master operating device 110 for switching operating devices on or off.

LIST OF REFERENCE NUMERALS 1, 1', 12' Operating device
2, 2' LED device
3 DALI bus
4 I²C bus
4a Supply unit
4b Data bus part
5 Supply grid
6 Switch
7a, b I²C bus participant
10 Rectifier
11 DC link capacitor
20, 20' First converter stage
21 Power measuring device
23 Transformer system
25 AC/DC converter
30 DC link capacitor
40, 40' Output stage
41a, b Output connection
41'a, b Output connection
50 Control device
50' Control part
50b Control part
50a Decoupling device
51 Control part
52 Temperature sensor
53 Memory
55 Control device
60 DALI interface
61 Galvanic decoupling
70 I²C interface
71 Galvanic decoupling
80 Communication link
80a, b Communication link
81a, b Communication link
82 Communication link
83 Supply line
84 Voltage adjustment
85 Supply line
100, 100' Luminaire
110, 111 Operating device
120 Color sensor
122 Motion sensor
124 Light sensor
126 Communication device
126a I²C interface
126b Bluetooth interface
128 Motion detector
130 Tablet
140 Luminaire
150 Luminaire
160 Power measuring device
160a I²C interface
170 Relay
M1, M2 Modulation switch
G Gateway

What is claimed is:

1. An operating device for operating at least one lighting source, comprising:
   a grid input stage and at least one output stage connected to the grid input stage with output connections for connection to the lighting source;
   a control device for controlling the output stage or the operation of at least one lighting source;
   a first digital bidirectional control interface for connection to a first external digital control bus with addressing functionality for receiving external control information, in particular a DALI (Digital Addressable Lighting Interface) interface; and
   a second digital bidirectional control interface for connection to a second external digital control bus with addressing functionality;
   wherein the first and second control interfaces are configured to operate with different data protocols.

2. The operating device according to claim 1, wherein the second digital control interface has a transmission rate which is greater than the transmission rate of the first digital control interface.

3. The operating device according to claim 2, wherein the transmission rate of the second digital control interface is at least five times greater than the transmission rate of the first digital control interface.

4. The operating device according to claim 2, wherein the transmission rate of the second digital control interface is at least ten times greater than the transmission rate of the first digital control interface.

5. The operating device according to claim 1, comprising an operating time detecting device, a lighting source operating parameter detecting device and/or an internal temperature detecting device, a data processing device for data processing of the detected operating parameters and a memory for storing the detected and/or data-processed operating parameters.

6. The operating device according to claim 1, wherein the second digital control interface is configured as a user-programmable interface for providing a user-specific command set of the interface.

7. The operating device according to claim 1, wherein the operating device is configured for internal bidirectional data exchange between the two control interfaces.

8. The operating device according to claim 1, wherein the both interfaces are connected to the control device, so that the control of operating parameters for operating the lighting source connected to the operating device is configured to take place via both the first and the second control interface.

9. The operating device according to claim 1, wherein the operating device is configured to perform a maintenance function upon detection of faults, critical operating states of the operating device or the lighting source and/or upon reaching a service life limit of operating devices and/or lighting source, by transmitting associated information via the first and second interfaces or via the second interface, in particular to a data terminal connected to the second interfaces.

10. The operating device according to claim 1, wherein a load transmission device is arranged between the grid input stage and the output stage for galvanic decoupling, via which the internal connection between the first and second digital interface extends.

11. A lighting system comprising at least two operating devices according to claim 1, which are connected to one another via the respective second control interface via a common second digital bus.

12. The lighting system according to claim 11, wherein one of the at least two operating devices is connected via its first control interface via the first external control bus to a central control device and that the one of the at least two operating devices controls as master the operation of the lighting source connected to the other operating devices via the second external bus.

13. The lighting system according to claim 11, wherein a color sensor device is connected to the second control bus for detecting a spectral property of the light emitted by the lighting system, wherein one of the at least two operating devices interrogates as master the sensor signal of the color sensor device via the second external bus and, depending on the sensor signal, controls the supply of the own lighting source and the other of the at least two operating devices via the second external bus for supplying its lighting source in such a way that the color temperature of the light emitted by the lighting system is regulated to a predetermined color temperature.

14. The lighting system according to claim 11, wherein a data terminal is connected via a wireless communication device, to the second digital control bus, wherein control information is transmitted from the data terminal via the second control bus to the one of the at least two operating devices configured as a master, in which control information is transmitted internally to the first digital interface, from which it is transmitted via the first digital bus to another operating device connected to the first digital bus for controlling the supply of its lighting source.

15. The lighting system according to claim 11, wherein the at least two operating devices are connected on the supply side to a supply grid via an energy or power measuring device, wherein the energy or power measuring device has a bus interface with which the energy or power measuring device is connected to the second digital bus for transmitting electrical consumption values.

16. The lighting system according to claim 15, wherein the energy or power measuring device has a supply output to which the operating device configured as master is connected and the lighting system has a controllable switching device which is connected on the input side to the grid and on the output side to the respective grid stage of the other operating devices.

17. The lighting system according to claim 16, wherein the controllable switching device is a relay device.

* * * * *